(12) United States Patent
Wokhlu et al.

(10) Patent No.: US 10,452,287 B2
(45) Date of Patent: Oct. 22, 2019

(54) SYSTEM AND METHOD FOR SHARED MEMORY OWNERSHIP USING CONTEXT

(71) Applicant: Futurewei Technologies, Inc., Plano, TX (US)

(72) Inventors: Sushma Wokhlu, Frisco, TX (US); Lee Dobson Mcfearin, Plano, TX (US); Alan Gatherer, Richardson, TX (US); Hao Luan, Plano, TX (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 338 days.

(21) Appl. No.: 15/192,453

(22) Filed: Jun. 24, 2016

(65) Prior Publication Data
US 2017/0371570 A1    Dec. 28, 2017

(51) Int. Cl.
*G06F 3/06* (2006.01)
*G06F 12/084* (2016.01)
(Continued)

(52) U.S. Cl.
CPC .......... *G06F 3/0619* (2013.01); *G06F 3/0637* (2013.01); *G06F 3/0673* (2013.01); *G06F 9/50* (2013.01); *G06F 9/5016* (2013.01); *G06F 12/084* (2013.01); *G06F 12/0888* (2013.01); *G06F 12/1466* (2013.01); *G06F 12/0815* (2013.01); *G06F 2212/621* (2013.01)

(58) Field of Classification Search
CPC .................................................. G06F 9/3009
See application file for complete search history.

(56) References Cited

U.S. PATENT DOCUMENTS 5,953,530 A    9/1999    Rishi et al.
9,747,218 B2*    8/2017    Godard ............... G06F 12/0875
(Continued)

FOREIGN PATENT DOCUMENTS

JP    2009251967 A    10/2009

OTHER PUBLICATIONS

Adve, S.V., et al."Comparison of Hardware and Software Cache Coherence Schemes," 18th Annual International Symposium on Computer Architecture, 1991, pp. 1-11.
(Continued)

*Primary Examiner* — Gary W. Cygiel
(74) *Attorney, Agent, or Firm* — Slater Matsil, LLP

(57) ABSTRACT

It is possible to reduce the latency attributable to memory protection in shared memory systems by performing access protection at a central Data Ownership Manager (DOM), rather than at distributed memory management units in the central processing unit (CPU) elements (CEs) responsible for parallel thread processing. In particular, the DOM may monitor read requests communicated over a data plane between the CEs and a memory controller, and perform access protection verification in parallel with the memory controller's generation of the data response. The DOM may be separate and distinct from both the CEs and the memory controller, and therefore may generally be able to make the access determination without interfering with data plane processing/generation of the read requests and data responses exchanged between the memory controller and the CEs.

19 Claims, 9 Drawing Sheets

(51) Int. Cl.
   G06F 12/0888    (2016.01)
   G06F 12/14      (2006.01)
   G06F 9/50       (2006.01)
   G06F 12/0815    (2016.01)

(56) References Cited

U.S. PATENT DOCUMENTS

| | | | |
|---|---|---|---|
| 2002/0002654 A1* | 1/2002 | Tomohiro | G06F 12/1466 711/103 |
| 2012/0047516 A1* | 2/2012 | Barwick | G06F 9/461 718/108 |
| 2013/0160114 A1* | 6/2013 | Greenwood | G06F 21/606 726/21 |
| 2014/0223047 A1 | 8/2014 | Chavali et al. | |
| 2014/0281110 A1 | 9/2014 | Duluk, Jr. et al. | |

OTHER PUBLICATIONS

Northcutt Duane J., et al. "Decentralized Computing Technology for Fault-Tolerant, Survivable C31 Systems, System/Subsystem Specification," Carnegie-Mellon University: Strategic Defense Initiative Office, Rome Air Development Center, Jun. 1990, 288 Pages.
Porter, Don. "The Art and Science of Memory Allocation," CSE 506, Stonybrook University Department of computer Science, Nov. 14, 2011, Accessed Feb. 24, 2016, 11 Pages.
Snoeren, Alex C., "Memory Management," CSE 120: Principles of Operating Systems, University California San Diego Computer Science and Engineering, Web, Accessed Feb. 2016, pp. 1-54.
Stevens, Ashley. "Introduction to AMBA 4 ACE and big.LITTLE Processing Technology," ARM, Jun. 6, 2011, 1-15.
University of California Irvine, "Running Jobs on the HPC Cluster," Accessed Feb. 24, 2016, 17 Pages.
Valvano J. et al., "EE445M/EE360L.6 Embedded and Real-Time Systems/Real-Time Operating Systems," Lecture 12: Memory Management, Heap, Protection, Virtual Memory, Paging, University Texas Electrical and Computer Engineering, Apr. 27, 2015, Lecture, pp. 1-23.
Wikipedia, "Context Switch," Wikimedia Foundation, Inc., Accessed Feb. 24, 2016, 4 Pages.
Wikipedia, "Message Passing," Wikimedia Foundation, Inc., Accessed Feb. 24, 2016, 6 Pages.
Wikipedia, "Shared Memory," Wikimedia Foundation, Inc., Accessed Feb. 24, 2016, 5 Pages.
Wikipedia, "Page cache," Wikimedia Foundation, Inc., Accessed Feb. 29, 2016, 3 Pages.
Gupta, "A Distributed Directory Based Cache Coherence Scheme," A Thesis Submitted by the Faculty of Purdue University, In Partial Fulfillment of the Requirements for the Degree of Master of Science in Electrical Engineering, 1995, 107 pages.
Sukumar Ghosh, CS 2630 Computer Organization, Cache Memory, Spring 2016, available at http://homepage.cs.uiowa.edu/~ghosh/6016.8.pdf (accessed Feb. 23, 2016), 13 pages.

* cited by examiner

SYSTEM AND METHOD FOR SHARED MEMORY OWNERSHIP USING CONTEXT

TECHNICAL FIELD

The present invention relates generally to a system and method for shared memory ownership, and, in particular embodiments, to a system and method for shared memory ownership using context.

BACKGROUND

Next-generation wireless devices may use multi-core and/or parallel processing architectures to support the heightened signal processing requirements of Fifth Generation (5G) wireless network telecommunication protocols. In such architectures, memory resources may be shared by multiple central processing unit (CPU) elements (CEs) so that two or more CEs can simultaneously access the same memory resource. In this way, shared memory resources may provide an efficient means of passing data/messages between CEs that are executing different threads of an application. As used herein, the term "thread" refers to a sequence of programming instructions that is being executed by, or is otherwise scheduled for execution by, a single CE. In some instances, CEs executing different threads of an application may need to exchange data with one another in order to execute their respective threads. Shared memory provides an efficient means for passing data between CEs by allowing one CE to write data into a memory resource, and another CE to subsequently read the data from the memory resource. This is generally referred to as message passing.

Memory errors may occur when multiple CEs access the same shared memory resource if cache coherency is not maintained. More specifically, CEs will generally read data from a shared memory resource into a local cache of the CE, and then use the local copy of the data during execution of a corresponding thread. If another CE subsequently modifies the data stored in the shared memory resource via a write instruction, and then reads the modified data into its own cache, the local caches of the respective CEs will be inconsistent, meaning that cache coherency was not be maintained. Other scenarios, such as false sharing, may also affect cache coherency.

SUMMARY

Technical advantages are generally achieved, by embodiments of this disclosure which describe a system and method for shared memory ownership using context.

In accordance with an embodiment, an apparatus for shared memory processing is provided. In this example, the apparatus includes a data plane, a memory controller coupled to the data plane, and a plurality of central processing unit (CPU) elements (CEs) coupled to the data plane. The plurality of CEs include a CE configured to send a read request to the memory controller over the data plane that requests access to a shared memory resource. The apparatus further includes a Data Ownership Manager (DOM) coupled to the data plane. The DOM is configured to detect the read request, to determine whether a thread assigned to the CE is permitted to access the shared memory resource based on one or more identifiers (IDs) in the read request, and to send a control signal to the memory controller indicating whether the thread being executed by the CE is permitted to access the shared memory resource.

In accordance with another embodiment, a method of for providing memory protection for shared memory is provided. In this example, the method includes detecting a read request requesting access to a shared memory resource by a DOM. The read request is communicated from a central processing unit (CPU) element (CE) to a memory controller. The method further includes determining whether a thread assigned to the CE is permitted to access the shared memory resource based on one or more identifier (IDs) in the read request, and sending a control signal from the DOM to the memory controller that indicates whether the thread being executed by the CE is permitted to access the shared memory resource.

In accordance with yet another embodiment, a method for managing a cache is provided. In this example, the method includes sending a read request from central processing unit (CPU) element (CE) to a memory controller without independently verifying whether a thread is permitted to access a shared memory resource. The read request requests access to the shared memory resource. The method further includes receiving a data response from the memory controller that includes a response code that indicates whether the thread being processed by the CE is permitted to access the shared memory resource, and processing the data response based on the response code.

In accordance with yet another embodiment, a method for memory control is provided. In this example, the method includes storing a plurality of data ownership table (DOT) entries of a DOT for a memory. Each of the plurality of DOT entries comprises a context identifier identifying a shared context, a job identifier identifying at least one task of a plurality of computing tasks that share the shared context, and an access permission for a shared memory block associated with the shared context.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
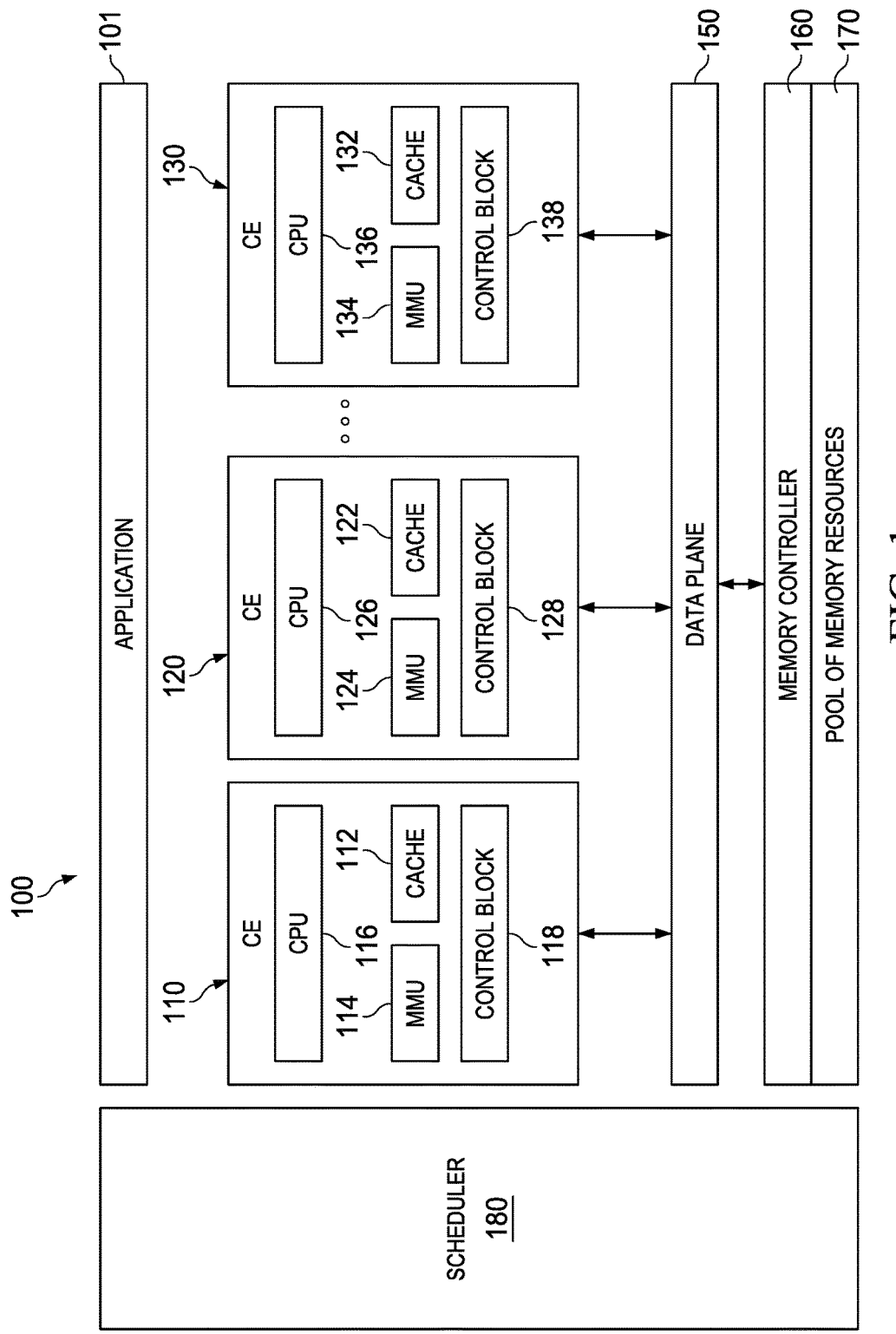
FIG. 1 is a block diagram illustrating a multicore processing system.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As used herein, the term "CE" may generally refer to any component that attempts to access a shared memory resource. For example, a CE may be a core of a multi-core processor or a processor in a parallel processing system. A CE may be a component that does not directly execute threads, such as a direct memory access controller (DMA).

Memory protection techniques may be employed to avoid and/or mitigate memory errors in shared memory architectures. Conventional memory protection schemes rely primarily on distributed memory management units (MMUs) in the CEs to verify access permissions and maintain cache coherency. In particular, an MMU may verify that a thread being executed by a host CE has permission to access a given memory resource before the data is made available to a CPU in the CE for execution of a thread. By way of example, a CE executing a particular thread may send a read request to a memory controller in order to access data stored in shared memory resource. As used herein, the term "read request" refers to a read-only (RO) request or a read-write (RW) request. The read request may generally include an address assigned to the shared memory location that is being accessed. Prior to sending the read request, an MMU in the CE may perform an access check to determine whether the thread being executed by the CE has the appropriate access permission. In general, the MMU performs the access check by searching for the address, carried by the read request, in a page table. The page table may list addresses, or a range of address, that a given thread is permitted to access. If the MMU determines that the address is not listed in the page table, or within a range of addresses listed in the page table, the MMU generates a page fault, and the read request is not forwarded to the MMU. A page fault is an interrupt that may cause the CE to suspend its processing of the thread, and perform a self-correcting operation.

If the MMU determines that the address is listed in the page table, or within a range of addresses listed in the page table, then access permission is confirmed, and the read request is sent to the memory controller. The memory controller then processes the read request, and returns a data response to the CE that includes the data stored in the memory resource. Upon reception, the MMU or a local control block in the CE may store the data into the local cache, at which time the data is made available to a CPU in the CE for execution of the thread.

It may take several clock cycles (e.g., roughly four clock cycles) for an MMU to verify an access permission prior to sending the read request to the memory controller. This generally delays the CPU's access to the data, thereby introducing latency into execution of the thread. Additionally, the CE/CPU may need to accommodate, or adjust for, the clock cycles used to verify the access permission by the MMU, which adds complexity to the design of the CE/CPU.

Embodiments provided herein reduce latency attributable to memory protection in shared memory systems by performing access protection at a central Data Ownership Manager (DOM), rather than at distributed MMUs in the CEs. In particular, the DOM may monitor read requests communicated over a data plane between the CEs and the memory controller, and perform access protection verification in parallel with the memory controller's generation of the data response. The DOM is separate and distinct from both the CEs and the memory controller, and therefore generally is able to make the access determination without interfering with data plane processing/generation of the read requests and data responses exchanged between the memory controller and the CEs. After making the access permission determination, the DOM transmits a control signal to the memory controller indicating whether a thread being executed by the requesting CE is permitted to access the corresponding shared memory resource. The control signal may also include cache attributes. Cache attributes may qualify how a particular unit, or piece, of memory is to be cached, such as read only cacheable, read-write cacheable, non-cacheable, write through, write back, etc. The memory controller then sets a response code in the data response to indicate whether the thread being executed by the requesting CE is permitted to access the shared memory resource, and sends the response code to the requesting CE.

The response code in the data response improves efficiency of the CE in so far as it allows the CE to send the read request without having to independently verify that the thread is permitted to access the shared memory resource. This saves several clock cycles when compared with conventional memory protection techniques, which typically require an MMU in the CE to verify access permissions prior to the data being stored in the local cache.

The DOM may determine whether a given thread is permitted to access a shared memory resource based on one or more identifiers (IDs) in the read request. In some embodiments, the DOM makes the access permission determination by comparing one or more IDs in the read request with one or more IDs associated with the corresponding shared memory location in a data ownership table. The data ownership table may be maintained by the DOM according to context instructions received from a hypervisor as well as read requests received from CEs. In one example, the data ownership table associates a context identifier (ID), a job ID, and an access privilege with each shared memory resource. The context ID in the data ownership table may identify threads that are permitted to read data from a given memory resource.

The Job ID may provide a mechanism for allowing multiple threads to access a shared memory resource via a read-write (RW) request at the same time. In particular, shared memory access protocols often include a general rule that prohibits multiple threads from accessing a memory resource with a read-write request at the same time, even when the threads share the same context ID. This general rule is intended to maintain coherency between the shared memory resource and the local caches of the CEs. However, in some instances, an underlying application may be designed to maintain coherence and ordering between threads when the threads are simultaneously modifying data in a shared memory resource via a RW request.

Embodiments of this disclosure assign a job ID to those threads in order to allow an application to override the general rule prohibiting multiple threads from accessing a memory resource with a RW request at the same time. More specifically, a DOM may store the context ID and job ID carried by an initial RW request in the data ownership table when an initial thread accesses a memory resource using a RW request. Thereafter, if a subsequent thread attempts to access the memory resource with a subsequent RW request, the DOM may compare both the context ID and the job ID of the subsequent RW request with the context ID and the job ID stored in the data ownership table. If both pairs of IDs match, then the DOM may grant RW access permission to the subsequent thread before the memory resource is released by the initial thread.

To improve system scalability, the DOM may only compare context IDs for RO requests. Hence, on one hand, the DOM may compare a context ID and a job ID in a RW request with the context ID and the job ID in the data ownership table. On the other hand, the DOM may only compare the context ID in a RO request to the context ID associated with the corresponding memory resource in the data ownership table. This may improve scalability by allowing the DOM to process RO requests more quickly/efficiently than RW requests. The DOM may also store faulty access information in debug registers of the DOM to improve the ability to debug impermissible access attempts.

An additional benefit of performing access verification at the DOM is that it allows the caches to be managed at a finer granularity. When access verification is performed at distributed MMUs, cache attributes are set/stored in the page tables maintained by the MMU at the CE. For practical reasons, memory is generally written into the page tables on a page-by-page basis, meaning that the minimum block-memory size is approximately 4 kilobytes (KBs), which is the size of a single page. When access verification is performed at the DOM, the cache attributes are set/stored in the DOT table maintained by the DOM at the cache line boundary. Memory may generally be written to a much lower granularity at the cacheline boundary, e.g., 64 bytes, 128 bytes, or 256 bytes. Thus, performing the access verification at the DOM allows for the attributes to be written into the corresponding table at a much lower granularity, thereby allowing the memory resources to be used more efficiently. These and other aspects are described in greater detail below.

FIG. 1 is a block diagram of a conventional processing system 100 in which a plurality of CEs 110, 120, 130 share resources in a pool of memory resources 170. In particular, a scheduler 180 separates programming code of an application 101 into a plurality of threads, which are assigned to be executed by the CEs 110, 120, 130. The threads may be assigned context identifiers (IDs) based on an order in which the threads are to be executed. The CEs 110, 120, 130 may execute their assigned threads in parallel.

The CEs 110, 120, 130 may be independent processors and/or independent cores of a multi-core processor. As shown, the CE 110 includes a local cache 112, an MMU 114, a CPU 116, and a control block 118. Likewise, the CE 120 includes a local cache 122, an MMU 124, a CPU 126, and a control block 128, and the CE 130 includes a local cache 132, an MMU 134, a CPU 136, and a control block 138. The local caches 112, 122, 132 are used to store data that is read from the pool of memory resources. The control blocks 118, 128, 138 are configured to manage the local caches, and the MMUs 114, 124, 134 are configured to perform various tasks, such as memory protection, address translation, and cache attribute verification. The CPUs 116, 126, 136 are configured to execute a thread based on data stored in the local cache 112. The CPUs 116, 126, 136 may be general-purpose processors and/or specialized processors, such as digital signal processors (DSPs), hardware accelerators (HACs), etc.

The CEs 110, 120, 130 access the pool of memory resources 170 by sending read requests to the memory controller 160 via the data plane iso. The data plane 150 is an interface (e.g., bus, etc.) between the CEs 110, 120, 130 and the memory controller 160. The memory controller 160 manages the flow of data going into, and out of, the pool of memory resources 170. The memory controller 160 may be a digital circuit that is implemented on a stand-alone chip or otherwise integrated into another chip, e.g., as part of a multi-core microprocessor.

As mentioned above, the MMUs 114, 124, 134 may perform access verification prior to sending a read request to the memory controller 260 to ensure that the threads being executed by the CEs 110, 120, 130 are permitted to access the corresponding shared memory resource. This may introduce latency into thread execution, as well as syphon off processing resources that could otherwise be used by the CPUs 116, 126, 136 when executing the thread.

Figure 2:
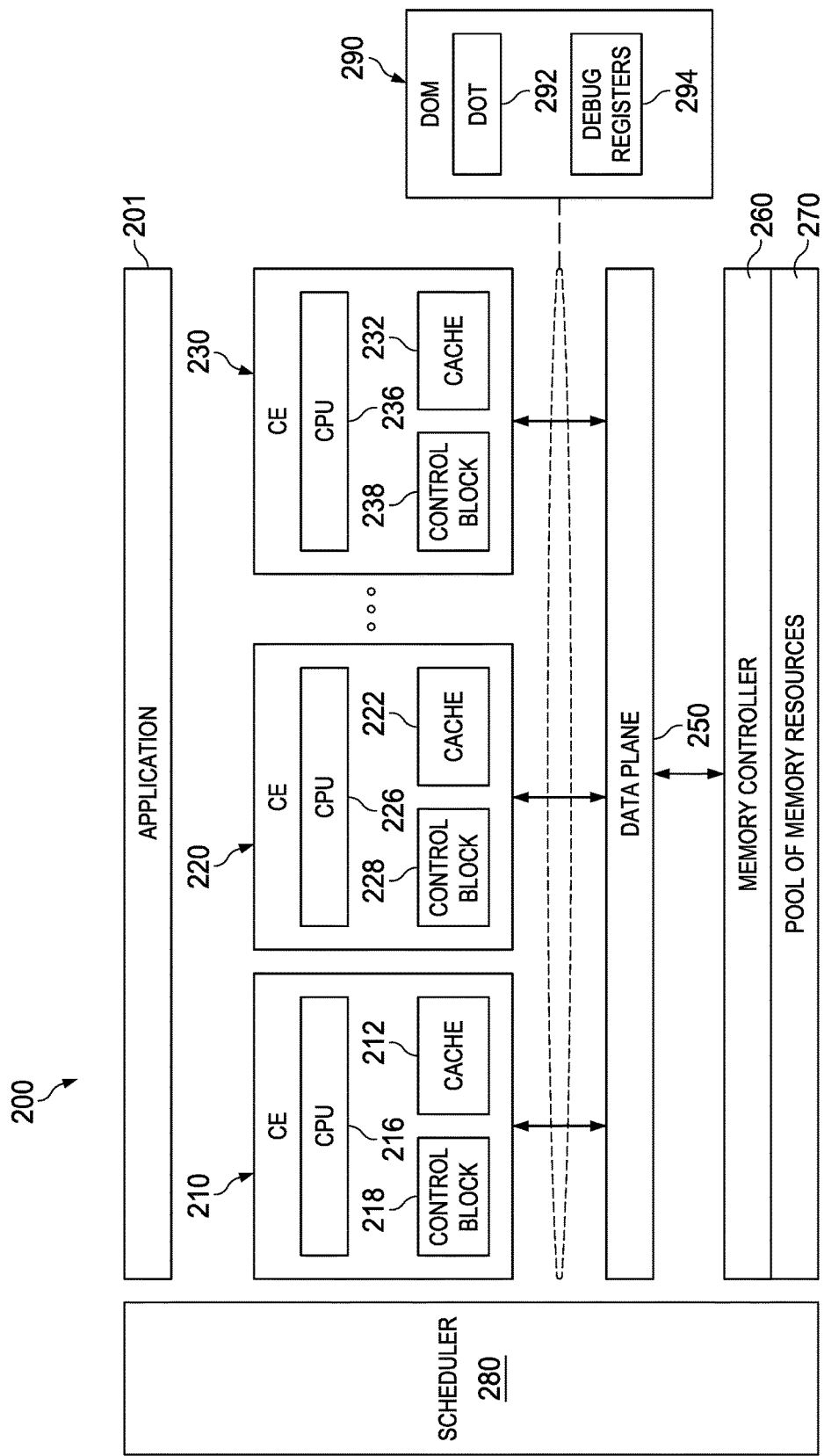
FIG. 2 is a block diagram of an embodiment multi-core processing system in which a Data Ownership Module (DOM) provides access protection for shared memory resources.

Embodiments of this disclosure offload access protection and/or other tasks (e.g., cache coherency verification, etc.) from the distributed MMUs to a centralized DOM in order to reduce latencies and/or processing inefficiencies that result from MMU operation of the MMUs. FIG. 2 is a block diagram of an embodiment multi-core processing system 200 in which a DOM 290 provides access protection for a pool of memory resources 270 shared by a plurality of CEs 210, 220, 230. The application 201, the data plane 250, the pool of memory resources 270, and the scheduler 280 may be configured similarly to the application 101, the data plane iso, the pool of memory resources 170, and the scheduler 180 in the processing system 100. In this example, the DOM 290 monitors read requests communicated from the CEs 210, 220, 230 to the memory controller 260 over the data plane 250, and verifies that the threads being executed by the CEs 210, 220, 230 are permitted to access the corresponding memory resources. The DOM 290 may verify access permissions based on one or more IDs in the read requests. The memory controller 260 and the DOM 290 may process the read requests in parallel such that the DOM 290 determines whether a given thread is permitted to access the shared memory resource without delaying generation of the data response by the memory controller 260. In some embodiments, the DOM 290 and the memory controller 260 may have different clocks speeds. For example, the DOM 290 may have a clock speed that is higher than the memory controller 260 so that the DOM 290 can determine the access permission prior to generation of the data response by the memory controller 260. In some embodiments, the clock speed of the DOM 290 is roughly twice that of the memory controller 260.

The DOM 290 includes a data ownership table (DOT) 292 and one or more debug registers 294. The DOM 290 may use the DOT 292 to perform access permissions. In the event that an access permission is deemed invalid, the DOM 290 may store a faulty access information corresponding to the read request in the debug registers 294. The faulty access information may include any information that may prove useful during debugging, such as a CE ID, a physical address, a time stamp, and access attributes carried by the read request.

Figure 3:
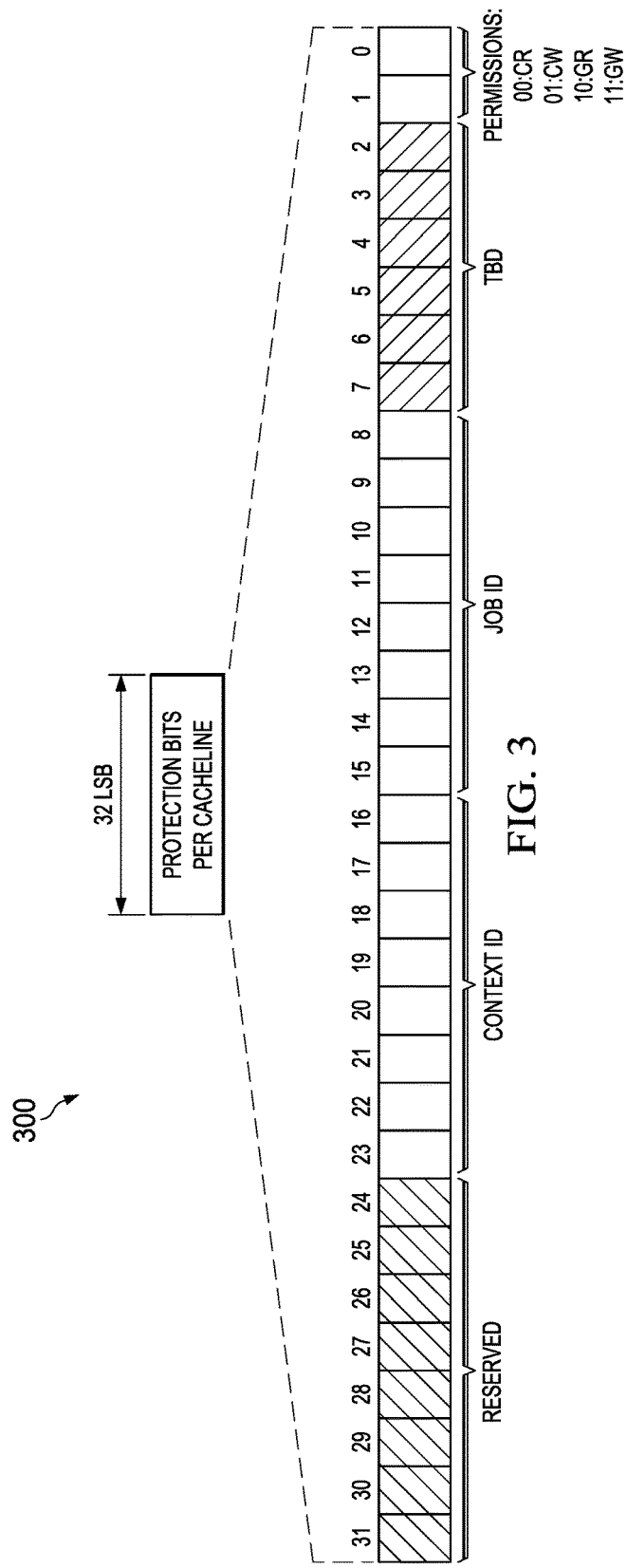
FIG. 3 is a diagram of an embodiment data ownership table entry.

FIG. 3 is a diagram of an embodiment entry 300 in a DOT. As shown, the entry 300 associates a cache line with a context ID, a job ID, and access permissions. The cache line may be a pointer to a memory resource. The context ID identifies which threads can read data from the memory resource. The job ID identifies which threads can modify data in the memory resource. A context read (CR) access permission allows CEs with a specific context to read data from the corresponding shared memory location. A context write (CW) access permission allows CEs with a specific context to write data to the corresponding shared memory location. A global read (GR) access permission allows all CEs to read data from the corresponding shared memory location irrespective of their context. A global write (GW) access permission allows all CEs to write data to the corresponding shared memory location irrespective of their context.

A DOM 290 may perform different access checks for RO requests and RW requests. In particular, the DOM 290 may compare both a context ID and a job ID in a RW request with a context ID and a job ID in the DOT 292. If both the context IDs and the job IDs match, then the DOM 290 may verify that the thread being processed by the requesting CE has permission to access, and modify, data stored in the memory resource. In comparison, the DOM 290 may compare a context ID in a RO request with a context ID in the DOT 292 without comparing the job ID in the RO request with the job ID in the DOT 292. If the context IDs match, then the DOM 290 may verify that the thread being processed by the requesting CE has permission to read data stored in the memory resource. This may improve scalability by reducing the number of steps/tasks the DOM 290 must perform to verify access permission for RO requests.

Figure 4:
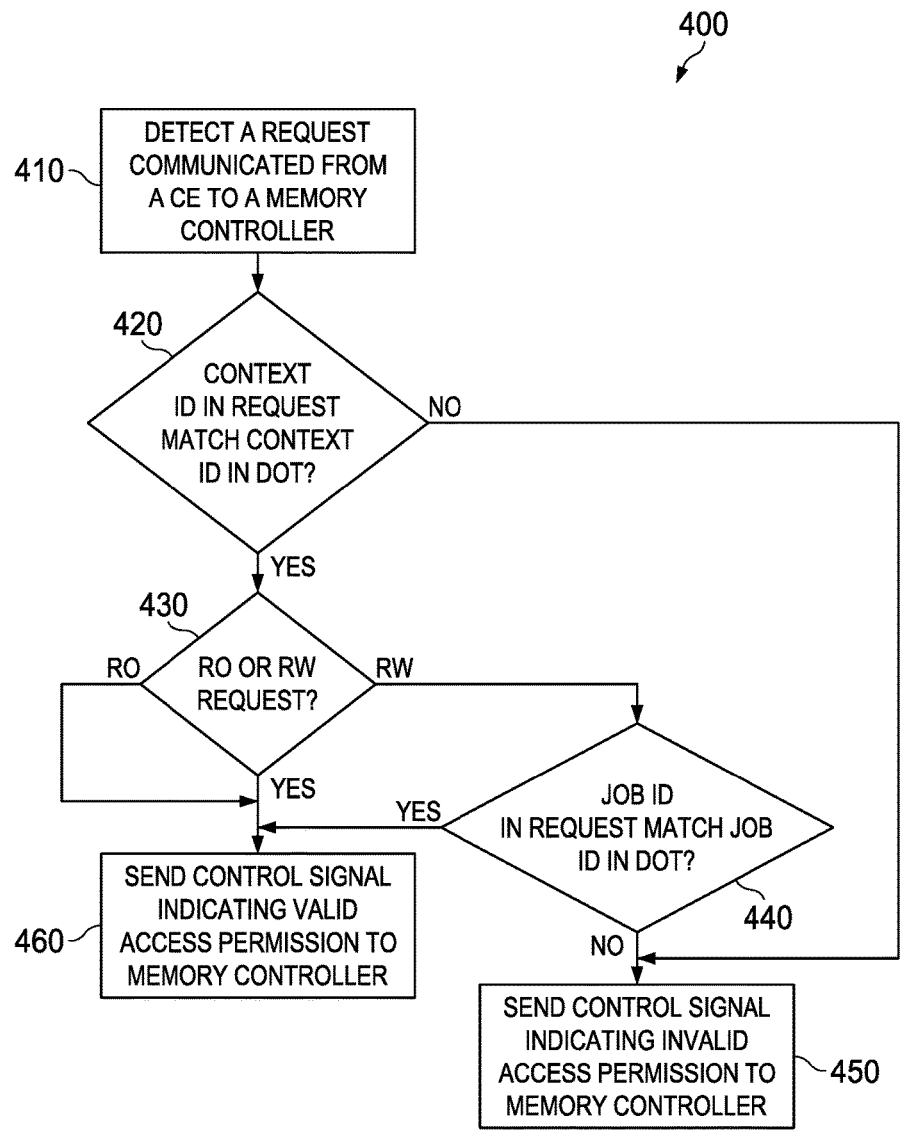
FIG. 4 is a flowchart of an embodiment method for providing access protection for shared resources.

FIG. 4 is a flowchart of an embodiment method 400 for providing access protection for shared resources, as may be performed by a DOM. At step 410, the DOM detects a request communicated from a CE to a memory controller. The request requests access to a shared memory resource. At step 420, the DOM determines whether a context ID in the request matches a context ID in the DOT. If not, the DOM sends a control signal indicating an in-valid access permission to the memory controller at step 450. Otherwise, if the context ID in the request matches a context ID in the DOT, then the DOM determines whether the request is a read-only request at step 430. If the request is a RO request, then the DOM sends a control signal indicating a valid access permission to the memory controller at step 460. If the request is a RW request, then the DOM also compares a job ID in the request with a job ID associated with the memory location in the DOT at step 440. If the job ID in the request matches the job ID in the DOT, then the DOM sends the control signal indicating a valid access permission to the memory controller at step 460. Otherwise, if the job ID in the request does not match the job ID in the DOT, the DOM sends a control signal indicating an in-valid access permission to the memory controller at step 450. The memory controller sets a response code in the data response based on the control signal received in steps 450, 460 to indicate that the thread being executed by the requesting CE is permitted to access the memory resource.

Figure 5:
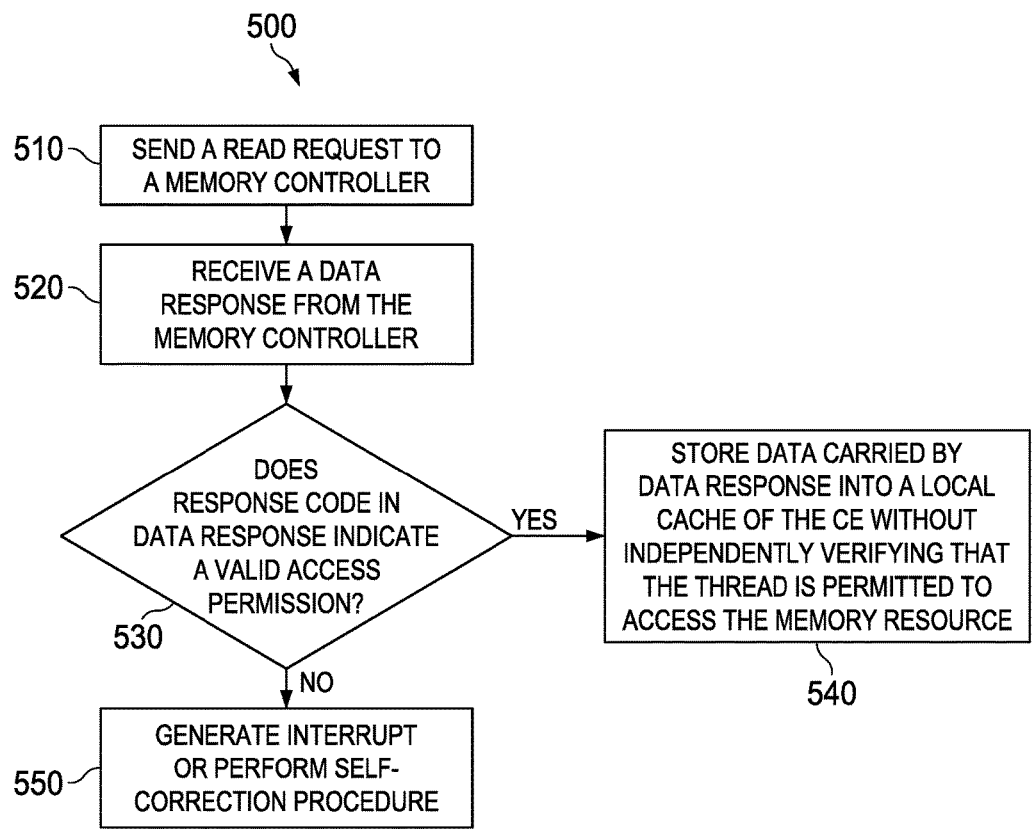
FIG. 5 is a flowchart of an embodiment method for providing access protection for expeditiously processing a data response received from a memory controller based on control signaling received from a DOM.

FIG. 5 is a flowchart of an embodiment method for expeditiously processing a data response, as may be performed by a CE. At step 510, the CE sends a read request to a memory controller. The read request sent by the CE may be a read only (RO) or a read-write (RW) request. At step 520, the CE receives a data response from the memory controller. At step 530, the CE determines whether a response code in the data response indicates a valid access permission. If so, the CE stores data carried by the data response into a local cache of the CE without independently verifying that the thread is permitted to access the memory resource at step 540. If not, the CE performs may generate an interrupt, performs a self-correction procedure at step 550. Alternatively, the CE may request that a hypervisor assign the CE a greater access permission, and then re-attempt access, e.g., send another read request for the shared memory resource.

Figure 6:
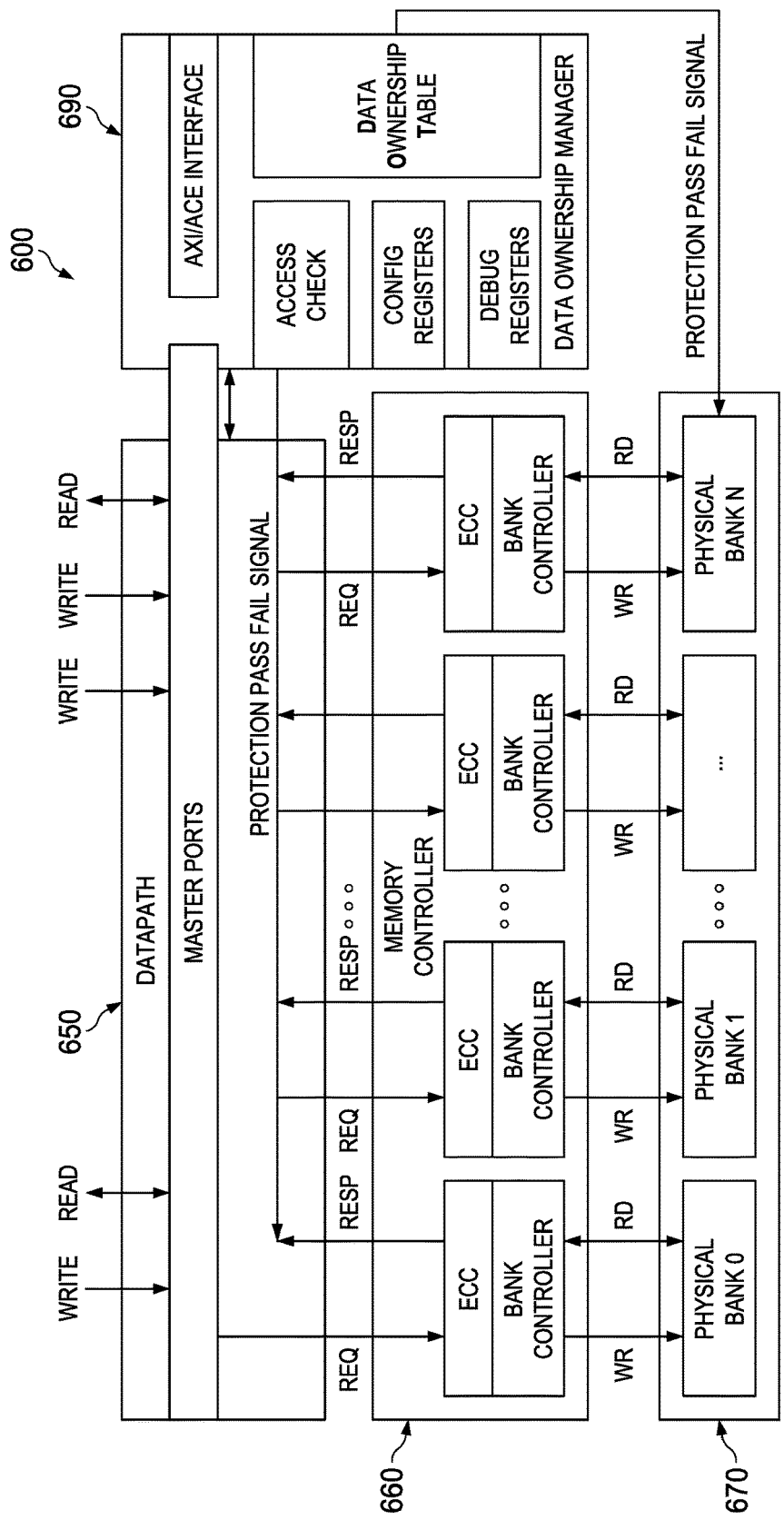
FIG. 6 is a block diagram of another embodiment multi-core processing system in which a DOM provides access protection for shared memory resources.

FIG. 6 is a block diagram of a multi-core processing system 600 in which a DOM 690 provides access protection for shared memory resources 670. In this example, the DOM 690 serves as a memory protection unit for the multi-core processing system 600. The DOM 690 may monitor the data path 650, and verify access protection for all read requests. The DOM 690 may also maintain a DOT 692, which stores all relevant access information pertaining to shared memory resources 670. The DOM 690 may provide cache attributes, as well as set/change permissions associated with memory resources based on requests received from context CEs. The DOM 690 may also store faulty access information in debug registers 694. The DOM 690 may communicate control signaling to the memory controller 660 that indicates either a valid or invalid access permission for each read request.

Figure 7:
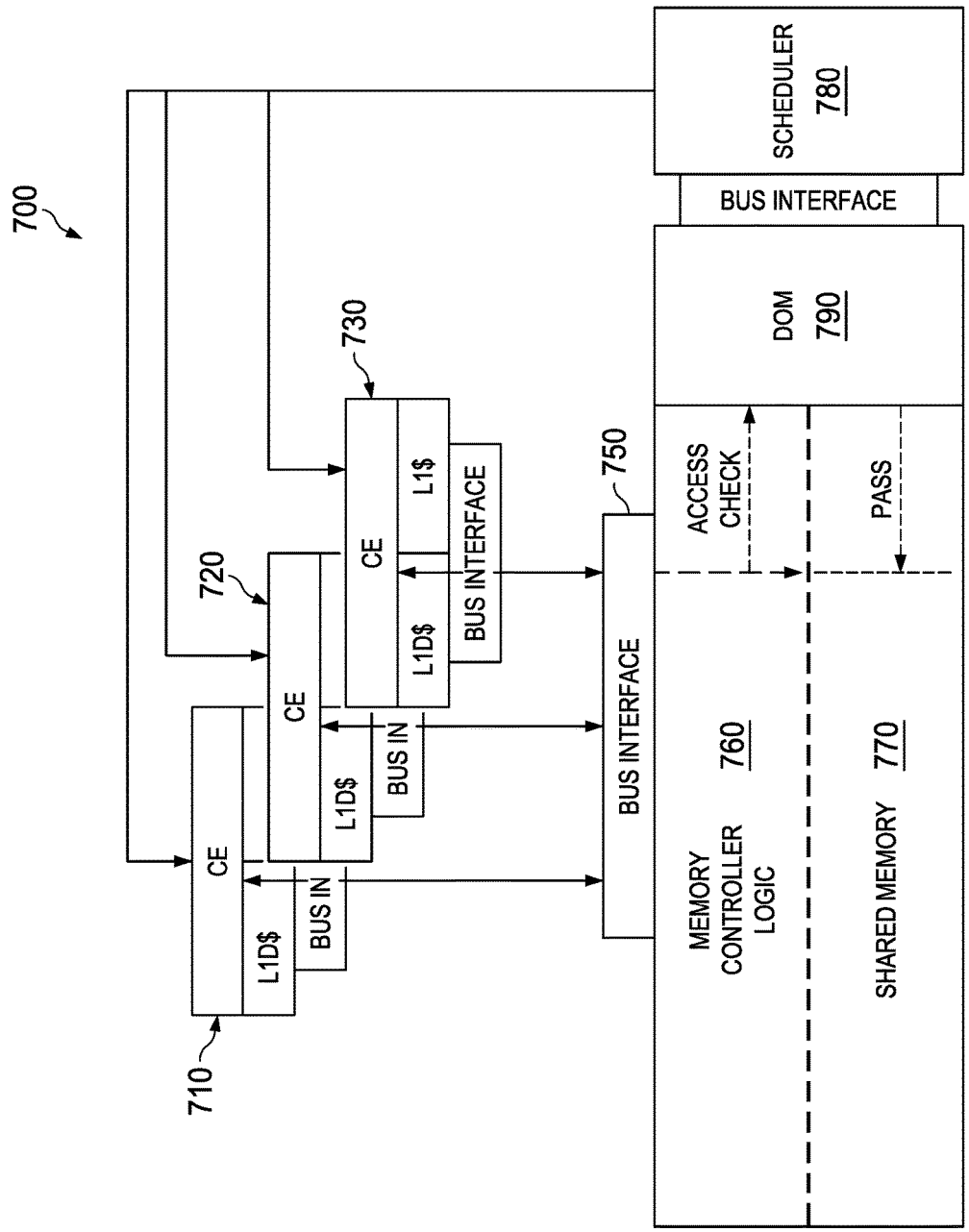
FIG. 7 is a block diagram of yet another embodiment multi-core processing system in which a DOM provides access protection for shared memory resources.

FIG. 7 is a block diagram of a multi-core processing system 700 in which a DOM 790 provides access protection for shared memory resources 770. In this example, the DOM 790 sets permissions for each memory resource, and checks permissions for each access attempt. The DOM is not located in the critical data path 750 between the CEs 710, 720, 730 and the memory controller 760, and as a result, does not introduce latency into the communication and processing of read requests and data responses.

A DOM may be a context aware module that is responsible for setting and changing contexts and permissions associated with shared memory resources based on qualified context requests. Upon receiving a context request, the DOM may check a context table to verify that the transaction context exists in the table and that the requesting party is qualified to set or change permissions. An example of a context table is provided in Table 1. As shown, the context ID table may include N-supervisor contexts. At reset, all the supervisor contexts may be programmed as hypervisor context. For example, a DOM may have 16 contexts programmed as hypervisor context at reset time. The DOM may look at shared memory as a set of variable size blocks with context attached to it. Each context may have its own permissions. Each context may have multiple buffers. The buffers may have different permissions. All memory blocks may be cache-line aligned.

TABLE 1

| Context (8-bits) | Description | Comments |
|---|---|---|
| 0 | Global permissions | Special context |
| 1 | Hypervisor | Special context At boot time programmed as supervisor for all IPs |
| xxxx | Supervisor Hypervisor(1) | 16-supervisor contexts and could be different for different IP |

A DOM may validate all shared memory access attempts without being in the critical path and without adding any extra cycles for access validation. A DOM may perform all access checks in parallel with the memory controller data path and flags data path if the access has passed protection checks or failed before accessing physical memory.

A DOM may maintain a common data ownership (context aware) table for shared memory. The data ownership table may be scalable to add any number of CEs. All protection checks may be done at the cacheline boundary. Cache attributes may be assigned at a cacheline granularity. The end CEs may configure different cache policies at cacheline granularity.

In some embodiments, multiple CEs sharing the same context may access a memory block with RO permissions. No additional checks will be performed. CEs accessing a memory block with RW permissions may have to go through additional job ID check to ensure that the application is aware of the sharing of RW buffers and will take care of coherence and ordering. In some instance, if a DOM receives a RW request and it is not aware of any other CEs accessing the corresponding memory resource, then the DOM only checks the context and job-id. This promotes scalability and flexibility, multiple CEs can be added removed as per need to access a buffer at any time In various embodiments, a multicore system having real-time data-flow with message passing includes data that is isolated in each of multiple parallel computing tasks (e.g., threads, processes, and the like) and that is consumed and shared by sending and receiving messages using, e.g., buffer pointers. The multicore system may be, for example, a Wireless Base Band (WBB) device. To make shared memory behave like a private memory for each time slice and to maintain coherency in a manner that is appropriate to the data application, the WBB includes a Data Ownership Manager (DOM) that performs protection checking of memory access requests. The DOM is context-aware and aligned with each cache line at its source in memory. In some embodiments, the DOM works in parallel with the pipeline of the shared memory controller and does not add any extra latency in the data access path.

In various embodiments, the DOM resides in a portion of shared memory that tracks all accesses and looks for sharing violations. Even when multiple tasks have the same permissions, the DOM may still keep track of which task has permission to access and/or modify each cache line worth of data in the memory. The DOM may use a data ownership table to track the ownership of shared memory blocks that has been established through access requests. As an example, for each access request that established ownership of a particular memory block, the data ownership table may store an entry that includes a context identifier (ID) that identifies the context of a task that requested the memory access (which is also the context of the shared memory block), a job ID that identifies the requesting task among different tasks that share the same context, and a resulting access permission of that task for accessing the memory block.

In various embodiments using a DOM, multiple tasks can own memory with a Read Only (RO) access permission, but only one task can own memory with a Read-Write (RW) access permission. Ownership is established automatically when memory is accessed. If a task attempts to read from a memory location, then that thread is assigned RO sharing ownership for the memory location, but if another task owns the memory location as RW at that time, a permission exception occurs. When memory is written by a task, it is promoted to RW sharing for that task, but if other tasks own the memory as RO or RW at that time, then a permission exception occurs. When a task terminates or when it releases a memory location, the Operating System (OS) informs the DOM and ownership is revoked for that task.

Figure 8:
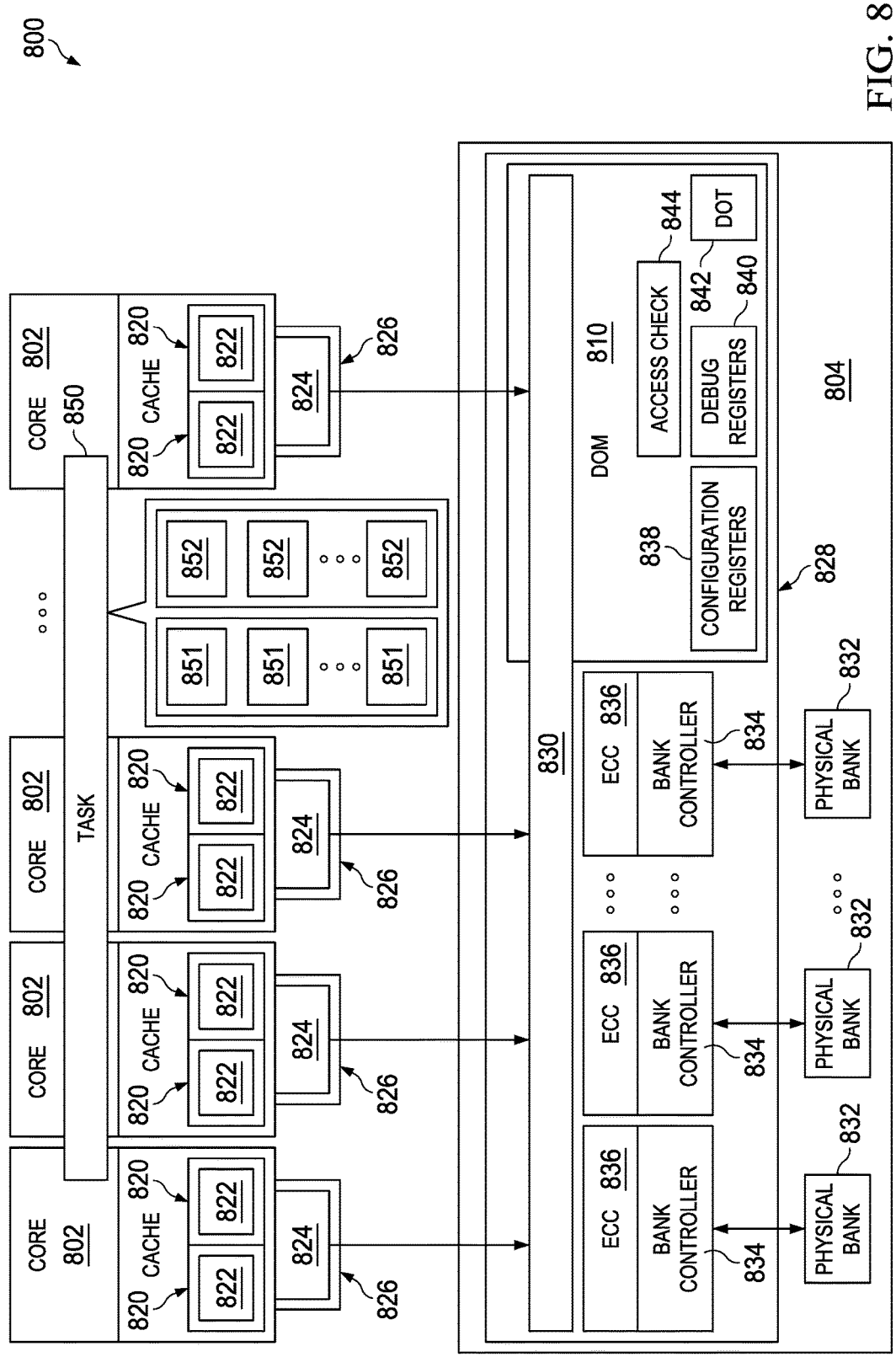
FIG. 8 is a block diagram of yet another embodiment multi-core processing system in which a DOM provides access protection for shared memory resources.

FIG. 8 is a block diagram illustrating an embodiment multicore processing system 800. In the embodiment of FIG. 8, each cache 808 includes multiple cachelines 820, each of which includes a variable-sized memory block 822 that is cacheline aligned. Additionally, the shared memory 804 includes a memory controller 828, and this memory controller 828 includes the DOM 810.

Each of the cores 802 communicates with the memory controller 828 via master ports 824 of bus interfaces 826. In an embodiment, core 802 has multiple master ports 824, while the remaining cores 802 have one master port 824 each. In other embodiments, any of the cores 802 may have multiple master ports 824.

Referring again to FIG. 8, a set of tasks 850, which includes tasks 851 and tasks 852, runs on one or more of the processor cores 802. Each of the tasks 850 interfaces with the shared memory 804 via a respective master port 824. Tasks 851 are associated with a first transaction context 861, while tasks 852 are associated with a second transaction context 862. In the embodiment of FIG. 8, a scheduler 864 is connected to the cores 802 for scheduling of tasks 850 by, for example, time multiplexing each of the two contexts 861 and 862 in its own time slice. In other embodiments, a single context or more than two contexts may be used.

The master ports 824 interface with a bus interface 830 of the memory controller 828. This bus interface 830 may be any interface that allows signaling between the master ports 824 and the memory controller, such as an AXI/ACE INTF. The shared memory 804 includes M physical memory banks 832 to 832. Each of these physical memory banks 832 to 832 is written to and read by bank controllers 834 of the memory controller 828. The accuracy of the data that is read and written by these bank controllers 834 is checked by Error-Correcting Code (ECC) modules 836 of the memory controller 828 that receive memory access requests from other components of the memory controller 828 and provide responses indicating whether these requests were successful.

The DOM 810 includes configuration registers 838, debug registers 840, a DOT 842, and an access check module 844. The debug registers 840 may be, for example, trace registers. The DOM 810 also provides a protection pass/fail signal to components of the memory controller 828.

In the embodiment of FIG. 8, some of the components of system 800 are clocked at a first clock frequency, while other components are clocked at half the first clock frequency. The components that are clocked at the first frequency include the access check module 844, the configuration registers 838, the DOT storage 842, the bus interfaces 826 and 830, the cores 802, the caches 808, the ECC modules 836, and the bank controllers 834. The components that are clocked at half the first frequency include the debug registers 849 and the physical memory banks 832. In an embodiment, the components of system 800 are pipelined such that the access validation by the DOM 810 is not in the critical path and does not add any extra clock cycles to the accesses of the shared memory 804. The DOM 810 nevertheless provides the protection checking pass/fail signal to the data path of the memory controller 828 before physical memory is accessed during each memory access. This protection checking provided by the DOM 810 includes both checking access permissions of a requesting task in the DOT for a target memory block. The protection checking by the DOM 810 also includes checking whether the transaction context of a requesting task is present in a context table of the memory controller 828, and whether that transaction context is qualified to set or change permissions of the target memory block.

As an example, the DOM 810 may have a global permissions context having a context ID of 0, a special boot time context called a hypervisor context that has a context ID of 8 and is programmed as a supervisor for all the cores 802, and 16 supervisor contexts that are normally identified by different context IDs but are all programmed with the hypervisor context ID of 1 at a reset time. In an embodiment, the context ID is an eight-bit identifier.

Figure 9:
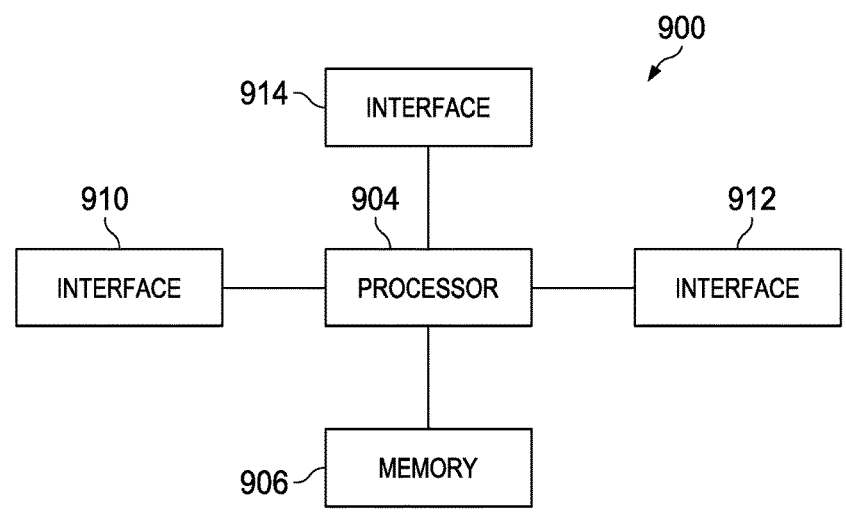
FIG. 9 illustrates a diagram of an embodiment processing system.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
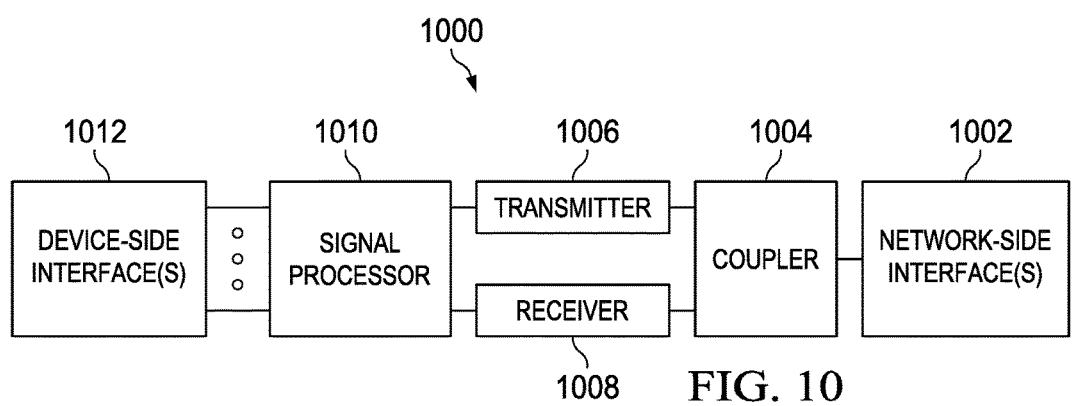
FIG. 10 illustrates a diagram of an embodiment transceiver.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a comparing unit/module, a calculating unit/module, and/or a detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
   a data plane;
   a plurality of central processing unit (CPU) elements (CEs) coupled to the data plane, the plurality of CEs including a CE configured to send a read request to a memory controller over the data plane, the read request requesting access to a shared memory resource;
   a centralized Data Ownership Manager (DOM) coupled to the data plane, wherein the centralized DOM is common to each of the CEs, and wherein the centralized DOM is configured to:

detect the read request,
determine whether a thread assigned to the CE is permitted to access the shared memory resource based on one or more identifiers (IDs) in the read request, and
send a control signal to the memory controller indicating whether the thread being executed by the CE is permitted to access the shared memory resource; and
the memory controller, coupled to the data plane and configured to send a data response to the CE, the data response including a response code that indicates whether the thread being executed by the CE is permitted to access the shared memory resource;
wherein the CE includes a local control block that is configured to process the data response based on the response code in the data response without independently verifying that the thread is permitted to access the shared memory resource.

2. The apparatus of claim 1, wherein the DOM determines whether the thread assigned to the CE is permitted to access the shared memory resource by:
comparing both a context ID and a job ID in the read request with a context ID and a job ID in a data ownership table in response to the read request being a read/write (RW) request; or
comparing the context ID in the read request with the context ID in the data ownership table without comparing the job ID in the read request with the job ID in the data ownership table in response to the read request being a read-only (RO) request.

3. The apparatus of claim 1, wherein the DOM is separate and distinct from the memory controller, and wherein the memory controller and the DOM process the read request in parallel such that the DOM determines whether the thread is permitted to access the shared memory resource without delaying generation of the data response by the memory controller.

4. The apparatus of claim 3, wherein the DOM operates at a higher clock speed than the memory controller such that the DOM determines whether the thread is permitted to access the shared memory resource prior to the memory controller generating the data response.

5. The apparatus of claim 1, wherein the local control block in the CE is configured to store data, carried by the data response, into a local cache of the CE without independently verifying that the thread is permitted to access the shared memory resource in response to the response code in the data response indicating that the thread is permitted to access the shared memory resource.

6. The apparatus of claim 1, wherein the local control block in the CE is configured to generate an exception without independently verifying that the thread is not permitted to access the shared memory resource in response to the response code in the data response indicating that the thread is not permitted to access the shared memory resource.

7. The apparatus of claim 1, wherein the local control block in the CE is configured to perform a self-correction without independently verifying that the thread is not permitted to access the shared memory resource in response to the response code in the data response indicating that the thread is not permitted to access the shared memory resource.

8. The apparatus of claim 1, wherein the DOM is further configured to store faulty access information corresponding to the read request in debug registers of the DOM in response to the thread not being permitted to access the shared memory resource.

9. The apparatus of claim 8, wherein the faulty access information includes one or more of a CE ID, a physical address, a time stamp, and access attributes carried by the read request in the debug registers.

10. The apparatus of claim 8, wherein the control signal includes cache attributes specifying that the shared memory resource is un-cacheable, read-only cacheable, or read-write cacheable.

11. A method for providing memory protection for shared memory, the method comprising:
detecting, by a centralized Data Ownership Manager (DOM), a read request communicated from a central processing unit (CPU) element (CE) to a memory controller, the read request requesting access to a shared memory resource, the CE being one of a plurality of CEs, and the centralized DOM being common to each of the CEs; and
determining, by the centralized DOM, whether a thread assigned to the CE is permitted to access the shared memory resource based on one or more identifiers (IDs) in the read request; and
sending, by the centralized DOM, a control signal to the memory controller, the control signal indicating whether the thread being executed by the CE is permitted to access the shared memory resource,
the control signal prompting the memory controller to set a response code in a data response sent from the memory controller to the CE, the response code indicating whether the thread being executed by the CE is permitted to access the shared memory resource, and
the response code in the data response prompting a local control block in the CE to process the data response without independently verifying that the thread is permitted to access the shared memory resource.

12. The method of claim 1, wherein determining whether the thread assigned to the CE is permitted to access the shared memory resource based on the one or more IDs in the read request comprises:
comparing both a context ID and a job ID in the read request with a context ID and a job ID in a data ownership table in response to the read request being a read/write (RW) request; being a read-only (RO) request.

13. The method of claim 11, wherein the response code in the data response prompts the local control block in the CE to store data, carried by the data response, into a local cache of the CE in response to the response code indicating that the thread is permitted to access the shared memory resource.

14. The method of claim 11, wherein the response code in the data response prompts the local control block in the CE to generate an exception or to perform a self-correction in response to the response code indicating that the thread is not permitted to access the shared memory resource.

15. The method of claim 11, further comprising:
storing, by the DOM, faulty access information corresponding to the read request in debug registers of the DOM in response to the thread not being permitted to access the shared memory resource, the faulty access information including one or more of a CE ID, a physical address, a time stamp, and access attributes carried by the read request in the debug registers.

16. A method for managing a cache, the method comprising:
- sending, by a central processing unit (CPU) element (CE), a read request to a memory controller without independently verifying whether a thread being processed by the CE is permitted to access a shared memory resource, the read request requesting access to the shared memory resource, the CE being one of a plurality of CEs, and the plurality of CEs having a common centralized Data Ownership Manager (DOM) providing memory access protection verification;
- receiving, by the CE, a data response from the memory controller, the data response including a response code that indicates whether the thread being processed by the CE is permitted, by the centralized DOM, to access the shared memory resource; and
- in response to the response code in the data response indicating whether the thread is permitted to access the shared memory resource, processing, by the CE, the data response based on the response code without independently verifying whether the thread is permitted to access the shared memory resource.

17. The method of claim 16, wherein the response code in the data response indicates that the thread is permitted to access the shared memory resource; and
- wherein processing the data response comprises storing data, carried by the data response, into a local cache of the CE.

18. The method of claim 16, wherein the response code in the data response indicates that the thread is not permitted to access the shared memory resource; and
- wherein processing the data response comprises generating an exception.

19. The method of claim 16, wherein the response code in the data response indicates that the thread is not permitted to access the shared memory resource; and
- wherein processing the data response comprises performing a self-correction.

* * * * *